(12) United States Patent
Dykeman et al.

(10) Patent No.: US 7,177,951 B1
(45) Date of Patent: Feb. 13, 2007

(54) ADDRESS MANAGEMENT IN PNNI HIERARCHICAL NETWORKS

(75) Inventors: Douglas Dykeman, Richterswil (CH); Michael Osbourne, Au (CH); Paolo Scotton, Rueschlikon (CH); Olen Stokes, Morrisville, NC (US); Claude Basso, Nice (FR); Marianne Aubry, St. Paul (FR); Minh-Tri Do Khac, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 1193 days.

(21) Appl. No.: 09/625,624

(22) Filed: Jul. 26, 2000

(30) Foreign Application Priority Data

Aug. 6, 1999 (EP) .................................. 99115580

(51) Int. Cl.
*G06F 15/16* (2006.01)
(52) U.S. Cl. .................. 709/249; 709/238; 709/250
(58) Field of Classification Search ............... 709/225, 709/238, 239–242, 249, 250; 370/396, 390–395, 370/238–256, 338, 328
See application file for complete search history.

(56) References Cited

U.S. PATENT DOCUMENTS 5,940,396 A * 8/1999 Rochberger .................. 370/408
6,078,575 A * 6/2000 Dommety et al. ........... 370/338
6,115,753 A * 9/2000 Joens .......................... 709/242
6,243,384 B1 * 6/2001 Eriksson et al. ........ 370/395.31
6,532,237 B1 * 3/2003 Or et al. ...................... 370/396
6,542,473 B1 * 4/2003 Song ........................... 370/254
6,600,724 B1 * 7/2003 Cheng ......................... 370/256
6,614,757 B1 * 9/2003 Rochberger et al. ......... 370/231

* cited by examiner

*Primary Examiner*—Frantz B. Jean
(74) *Attorney, Agent, or Firm*—Douglas W. Cameron; Anne Vachon Dougherty

(57) ABSTRACT

Address management methods and apparatus are provided for a node serving as peer group leader for a peer group of nodes in one level of the hierarchy of a PNNI hierarchical network, whereby the peer group leader represents the peer group to one or more neighboring nodes in the next level up of the hierarchy. The peer group leader has a memory (2) for storing peer group topology data (4), comprising address data which is supplied to the peer group leader from nodes in the peer group and represents addresses for access by the network, and peer group leader topology data (5), comprising address data which is supplied to said neighboring nodes by the peer group leader and represents addresses accessible via the peer group. The address management method comprises: checking whether addresses represented by said address data are accessible via the peer group; notifying said neighboring nodes of changes in the accessibility of addresses so identified; and updating said peer group leader topology data (5) in accordance with said changes.

25 Claims, 5 Drawing Sheets

ADDRESS MANAGEMENT IN PNNI HIERARCHICAL NETWORKS

FIELD OF THE INVENTION

This invention relates generally to address management in PNNI hierarchical networks, and more particularly to the management of addresses in accordance with their accessibility in such networks.

BACKGROUND OF THE INVENTION

PNNI (Private Network-to-Network Interface) is a hierarchical, dynamic link-state routing protocol defined by the ATM (Asynchronous Transfer Mode) Forum for use in ATM networks. The hierarchy extension and the use of a single routing protocol at all levels of the hierarchy allow the support for large-scale ATM networks. A key feature of the protocol is the ability to cluster network nodes into manageable groups called "peer groups". One node in each peer group serves as the "peer group leader" and represents that peer group as a single logical node ("logical group node" or LGN) in the next level up of the hierarchy. This concept is illustrated schematically in FIG. 1 of the accompanying drawings which shows a simple two-level hierarchical network. In the lowest level, level 1, of the hierarchy in this example, the nodes labeled AA1 to AA3, AB1 to AB3, AC1 and AC2 represent real network devices, such as switches, interconnected by links as shown. These nodes are clustered into three peer groups shown bounded by the broken lines in the figure. In each peer group, one node, shown shaded in the figure, is designated peer group leader. Each peer group leader is "elected" by a process specified by PNNI, and, in addition to its normal functions as a node within a peer group, serves to represent its peer group as a logical node in the next level up of the hierarchy. Thus, in the illustrated example, nodes AA1 to AA3 form a peer group which is represented, by peer group leader AA3, as logical node AA in level 2 of the hierarchy. Nodes AB1 to AB3 form a peer group which is represented, by peer group leader AB3, as logical node AB in level 2 of the hierarchy. Nodes AC1 and AC2 form a peer group which is represented, by peer group leader AC2, as logical node AC in level 2 of the hierarchy.

ATM is a source routing technology. To enable source route computation, the nodes must maintain information about the network topology. PNNI thus defines a system for the creation and distribution of topology data within a network. The topology data is defined by PNNI Topology State Elements (PTSE's) which are created and distributed by nodes so that each node can maintain a topology database which defines its view of the network. PTSE's include data relating to nodes, links and addresses ("reachable address prefixes") which can be accessed by network devices. Reachable address prefixes may be node and/or end system addresses and may be summarized, representing a collection of individual addresses summarized by a single address prefix, or native, representing a single node or end system address. PTSE's are flooded among nodes in a peer group so that each peer group node has the same topology database and thus the same view of the network. In the next level up of the hierarchy, however, the peer group topology is abstracted into a single logical node as described above. The peer group leader generates PTSE's advertising addresses accessible within its child peer group and distributes these to its neighbors in the next level of the hierarchy, but the details of nodes and links within the peer group are lost. It is this topology abstraction that reduces the resources required to define very large networks. However, it is a consequence of this topology abstraction that the accessibility, or "connectivity", of an address is known only within the peer group in which it originated. Thus, calls from outside a peer group to an address within the peer group may be instigated even though that address is in fact inaccessible, for example due to a link failure.

PNNI does define a "time-out" system for PTSE's whereby each PTSE is given a lifetime for which it is valid, normally one hour. A PTSE's originating node should "refresh" the PTSE every thirty minutes by redistributing the PTSE to its neighbors, so that the PTSE is again flooded through the peer group. Normally a PTSE may only be modified by its originating node (or in some cases by a proxy node acting on behalf of the originating node). However, if a PTSE's lifetime expires without the PTSE being refreshed, the PTSE is no longer considered valid topology information and is removed, or "flushed" from the topology database. That is, when a node detects that a PTSE's lifetime has expired, the PTSE is removed from that node's topology database and the expired PTSE is flooded (as an "empty" PTSE which indicates expiry of the topology element) throughout the peer group so that it is flushed from the peer group. Similarly, any PTSE created by the peer group leader defining that topology element will be flushed from the next level of the hierarchy, and so on throughout the network. Thus, if an address becomes inaccessible due to loss of connectivity within the peer group, expiry of the associated PTSE will eventually result in the address being flushed from the network (assuming connectivity is not restored in the meantime). Up to that time, however, call setup requests to that address may continue to be placed from outside the peer group, and will simply be rejected on reaching the peer group ingress.

Additional problems may arise with the existing scheme apart from that of unnecessary calls being placed to inaccessible addresses. For example, situations can arise where a device which has previously been connected as a node in one network configuration joins a new network configuration. Such a situation may result, for example, from changes in partitioning of peer groups in a network, or when a mobile node moves from one access point to another (Mobile PNNI). When connected in the new network configuration the node needs to adapt its peer group to the new situation. As part of the resulting database exchange process, the node may (and, in the case of a mobile node changing access points, invariably will) introduce reachable address prefixes from the hierarchy of its previous peer group. This can result in irrelevant addresses being advertised in the network, and presents the risk of routing via an invalid path.

As a further example, a serious problem can arise with the existing scheme in the case where a backup service is advertising the same reachable address as a primary service, for example a LECS (LAN Emulation Client Server). Should the primary server become isolated or stop functioning, all calls to this server from outside the peer group will continue to be routed to this server, and not to the backup server in another peer group, until the primary server address expires and is flushed from the network.

SUMMARY OF THE INVENTION

According to one aspect of the present invention there is provided a method of address management in a node serving as peer group leader for a peer group of nodes in one level of the hierarchy of a PNNI hierarchical network whereby the peer group leader represents the peer group to one or more neighboring nodes in the next level up of the hierarchy, the peer group leader having a memory for storing peer group topology data, comprising address data which is supplied to the peer group leader from nodes in the peer group and represents addresses for access by the network, and peer group leader topology data, comprising address data which is supplied to said neighboring nodes by the peer group leader and represents addresses accessible via the peer group, the method comprising:

checking whether addresses represented by said address data are accessible via the peer group;

notifying said neighboring nodes of changes in the accessibility of addresses so identified; and updating said peer group leader topology data in accordance with said changes.

In accordance with the present invention, therefore, the peer group leader can check whether addresses, ie. reachable address prefixes, are actually accessible in the peer group. Changes in the accessibility, or connectivity, of addresses so identified can be notified to its neighboring nodes in the next hierarchy level. Since the peer group leader is able to check address connectivity rather than merely relying on the validity of the associated PTSE's until their lifetime expires, in embodiments of the present invention the problems discussed above can be alleviated or eliminated.

Various criteria may be applied to determine when address checking is performed and which addresses are checked. For example, systems may be envisaged where the peer group leader checks addresses represented by address data in one or both of its topology databases periodically. The interval between checks may be set at less than the PTSE lifetime or refresh period, the particular frequency being determined according to the requirements of a particular system. This would alleviate some of the problems discussed above by reducing the length of time that inaccessible addresses remain apparently available for access by the network.

Preferably, however, address checking is performed in response to occurrence of an event which may signify a change in address accessibility in the peer group, and for the sake of efficiency it is further preferred that address checking is then only performed for addresses whose accessibility might be affected by that event.

As a particular example employed in preferred embodiments, when the peer group leader receives from its child peer group address data (eg by way of a PTSE) representing a new address, that is, an address which is not represented in said peer group topology data, the accessibility of that address within the peer group is checked. Then, only if the accessibility of the address is confirmed does the peer group leader supply address data representing that address to its neighbors in the next level of the hierarchy, for example by way of a PTSE, and update the peer group leader topology data with the new address data, eg. by storing the new PTSE. Thus, new addresses introduced within a peer group are advertised to the next level of the hierarchy only after checking that the address is accessible. This prevents irrelevant addresses, eg. from the old topology database of a mobile node moving to a new network access point, from being propagated in the network, thus preventing unnecessary network database changes and reducing transient topology database sizes, as well as avoiding the risk of routing via an invalid path which can otherwise result.

As a further example, address accessibility may be checked in response to detection by the peer group leader that a link connecting nodes in the peer group has become inoperative. This may be one of the peer group leader's own links, in which case the link failure will be detected directly by the peer group leader, or it may be a link between other nodes in the peer group, in which case the peer group leader will be notified by a PTSE sent by the node which first detects the link failure. Either way, a link failure may clearly result in previously accessible addresses becoming inaccessible within the peer group. Thus, in preferred embodiments the peer group leader responds to detection of a link failure by checking the accessibility of at least a class of addresses represented in said peer group leader topology data. For an address found to be inaccessible here, the peer group leader notifies its neighbors in the next level of the hierarchy of the loss of accessibility, for example by way of a PTSE, and updates the peer group leader topology data by removing the address data representing that address, for example by deleting the associated PTSE. While all addresses in the topology data could be checked here, it is more efficient only to check those addresses which are represented in the peer group leader topology data and which have therefore been advertised as accessible to the rest of the network. Moreover, it is not strictly necessary to check addresses accessible directly at the peer group leader node, since these will be unaffected by a link failure. Thus, of the addresses represented in the peer group leader topology data, only the class of addresses which were accessible at other nodes in the peer group, and for which the associated PTSE in the peer group topology data therefore originated from a node other than the peer group leader, need be checked for accessibility here.

Another example is where the peer group leader detects that a link has been established, for example because a previously inoperative link has been restored. Again this may be one of the peer group leader's own links or a link elsewhere in the peer group. In preferred embodiments, the peer group leader preferably responds to this event by checking whether at least a class of addresses represented in the peer group topology data, but not the peer group leader topology data, are now accessible. For an address found to be accessible here, the peer group leader supplies address data representing that address to its neighbors in the next hierarchy level and updates the peer group leader topology data with the new address data. Again, addresses accessible directly at the peer group leader node need not be checked here, so only the class of addresses in the peer group topology data which originated from other nodes in the peer group are preferably checked.

As described earlier, addresses may be summarized addresses, representing a collection of similar, individual device addresses. The summarization process may be carried out at all levels of the hierarchy. Thus, if the peer group leader receives a number of different PTSE's containing address data representing addresses capable of summarization, it may generate a summarized address accordingly. The summarized address would then be advertised in the next hierarchy level and address data representing that summary address stored in the peer group leader topology data. When a link becomes inoperative as described above, if an address in the peer group leader topology data is a summarized address generated by the peer group leader, and after checking the accessibility of the constituent addresses, not all of the constituent addresses are found to be inaccessible, then the change in accessibility of any one of the constituent address will generally not be advertised in the next hierarchy level since that level sees only the summary address and this is still at least partially valid. Similarly, if a new address is received by the peer group leader, if that address is already represented in the peer group leader topology data by summary address generated by the peer group leader, then no further advertisement of the new address in the next level may be required, so that accessibility checking may not be performed in these cases.

Various methods for checking the accessibility of addresses may be envisaged. For example, in some systems the peer group leader might check accessibility by attempting to send a message to that address, eg by initiating a call setup to that address. However, preferred embodiments check address accessibility by exploiting existing features of the PNNI protocol which provide the information necessary to make the accessibility determination. More specifically, as mentioned earlier PNNI defines a process for "election" of peer group leaders whereby the nodes in a peer group decide which particular node should serve as their peer group leader. The suitability of a given node to act as peer group leader depends on the connectivity of nodes in the peer group. The election process is an ongoing process so that if the connectivity of nodes in the peer group changes, for example if nodes or links are added or removed, the process is repeated to ensure that the most appropriate node is always selected as peer group leader. As part of the election process, each node must determine the current connectivity of nodes in the peer group. This is done by generating, from node and link state parameters defined by PTSE's, connectivity data which indicates the state of links and nodes in the peer group and thus how nodes are currently interconnected. The connectivity assessment process may be implemented by various known algorithms, for example a graph coloring algorithm whereby the connectivity data is presented in the form of a colored graph. The connectivity data is stored in the node's memory together with the topology data already described. This connectivity data is exploited in preferred embodiments of the present invention for checking the accessibility of addresses. In particular, in preferred embodiments the address data stored in the memory includes node id data indicating the particular node which originated that address data. Since PNNI already specifies that PTSE's should include the node id of the node which originated that PTSE, the node id data for a particular address may simply be the node id of the associated PTSE. Thus, the accessibility of an address can be checked simply by checking the connectivity data to determine whether the node corresponding to the node id in the address data is accessible.

It is to be appreciated that, in general, where features are described herein with reference to a method embodying the invention, corresponding features may be provided in accordance with apparatus embodying the invention, and vice versa. For example, another aspect of the present invention provides address management apparatus for management of addresses in a node serving as peer group leader for a peer group of nodes in one level of the hierarchy of a PNNI hierarchical network, whereby the peer group leader represents the peer group to one or more neighboring nodes in the next level up of the hierarchy, the peer group leader having a memory for storing peer group topology data, comprising address data which is supplied to the peer group leader from nodes in the peer group and represents addresses for access by the network, and peer group leader topology data, comprising address data which is supplied to said neighboring nodes by the peer group leader and represents addresses accessible via the peer group, the apparatus comprising control logic for accessing data in said memory and configured to:

check whether addresses represented by said address data are accessible via the peer group;

notify said neighboring nodes of changes in the accessibility of addresses so identified; and update said peer group leader topology data in accordance with said changes.

A further aspect of the present invention provides a device for connection in a PNNI hierarchical network as a node of said network, the device being operable to serve as peer group leader for a peer group of nodes in one level of the network hierarchy such that the device represents the peer group to one or more neighboring nodes in the next level up of the hierarchy, the device comprising: a memory for storing peer group topology data, comprising address data which is supplied to the device from nodes in the peer group and represents addresses for access by the network, and peer group leader topology data, comprising address data which is supplied to said neighboring nodes by the device and represents addresses accessible via the peer group; and address management apparatus as thereinbefore described.

A device embodying the invention may be a switch, router, bridge, brouter or other network device. The invention also extends to a PNNI hierarchical network comprising address management apparatus as hereinbefore described, for example a network wherein one or more of the nodes comprises a device embodying the invention.

BRIEF DESCRIPTION OF THE DRAWINGS

Embodiments of the invention will now be described, by way of example, with reference to the accompanying drawings in which.

DETAILED DESCRIPTION OF THE INVENTION

Figure 2:
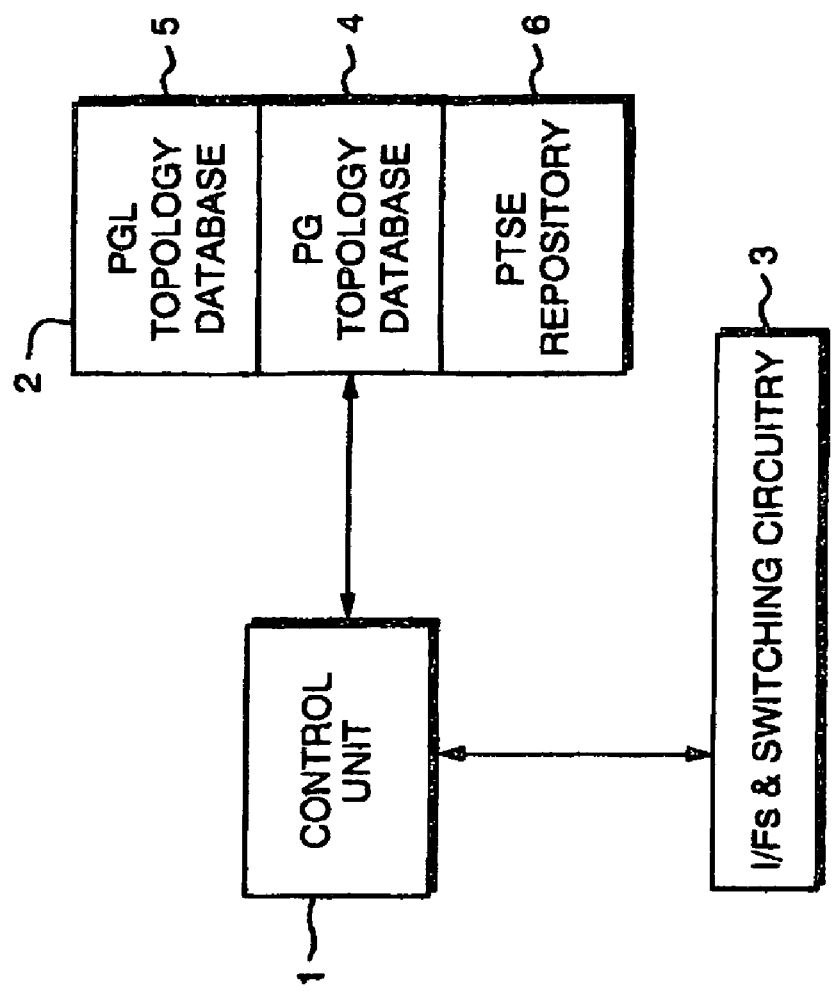
FIG. 2 is a schematic illustration of the main elements of a network device for implementing methods embodying the invention.

FIG. 2 is a schematic block diagram of an embodiment of a network device showing the main elements involved in implementing address management methods embodying the invention. As shown in the figure, the device, such as an ATM switch, comprises a control unit 1, a memory 2, and circuitry 3 which represents the interfaces (I/Fs) and switching fabric which connect the device with its links to neighboring nodes and via which the device communicates with the rest of the network. The control unit 1 controls operation of the device generally, and includes address management apparatus in the form of control logic (not shown separately) which controls the address management functions to be described below. The control logic may be implemented in hardware or software (program code), or a combination thereof, and suitable implementations will be apparent to those skilled in the art from the following description. In particular, the control unit 1 may be implemented by a suitably programmed processor, and the memory 2 may be an internal memory of the processor or an external memory associated with the processor. Where the address management control logic is implemented in software, the software may be supplied separately (as an element of the program code for a number of control functions or otherwise) for loading in a processor to configure the processor to operate as described. As indicated schematically in the figure, the memory 2 is used for storage of various data used in address management methods embodying the invention. In the present case, the device is serving as peer group leader so this data comprises a peer group (PG) topology database 4, a peer group leader (PGL) topology database 5, and a PTSE repository 6. The PG topology database 4 comprises the set of PTSE's defining the nodes, links, and reachable address prefixes (RA's) for the peer group in which the device is currently connected in accordance with the PNNI protocol. The PGL database 5 comprises the set of PTSE's relating to the next level of the PNNI hierarchy in which the peer group leader device represents its peer group as a logical group node. The PGL topology database thus includes PTSE's created by the peer group leader relating to RA's within its child peer group which have been advertised at the next level, or peer group leader level, of the hierarchy. The contents of the PG and PGL topology databases 4 and 5 represent a subset of all the PTSE's which are stored by nodes in accordance with the PNNI protocol, the additional PTSE's being stored in the PTSE repository 6 of the memory.

In apparatus embodying the invention, the processing of PTSE's is carried out generally in accordance with the existing scheme specified by PNNI. However, in embodiments of the invention, the peer group leader implements an address management system whereby the accessibility, or "connectivity" of RA's is checked in response to occurrence of events which may signify a change in RA connectivity. Such an event may be indicated by a PTSE received by the peer group leader from a node in its child peer group, or may be a change in status of one of the peer group leaders own links which is detected directly by the peer group leader. In order to check connectivity of an RA, the peer group leader makes use of connectivity data which is maintained by nodes in accordance with PNNI for the purpose of the peer group leader election process mentioned earlier. When a node is added or removed in the peer group, or a link is established or an existing link becomes inoperative, the choice of peer group leader must be reassessed based on the new peer group connectivity. Thus, each node updates its connectivity data with changes in node and link status. The connectivity update process may be implemented in known manner, for example by a graph coloring algorithm, and the new connectivity data, eg. in the form of a colored graph, is stored in the PG topology database of the node. The connectivity data thus indicates the connectivity of peer group nodes, each of which is identified by a node id. In order to check the connectivity of RA's in methods embodying the present invention, the peer group leader checks the node id included in the PTSE for a particular RA (which indicates the node which originated that RA) against the connectivity data stored in memory to determine if the node originating that RA is accessible via the peer group. If so, the RA is deemed accessible. If not, the RA is deemed inaccessible.

Figure 3:
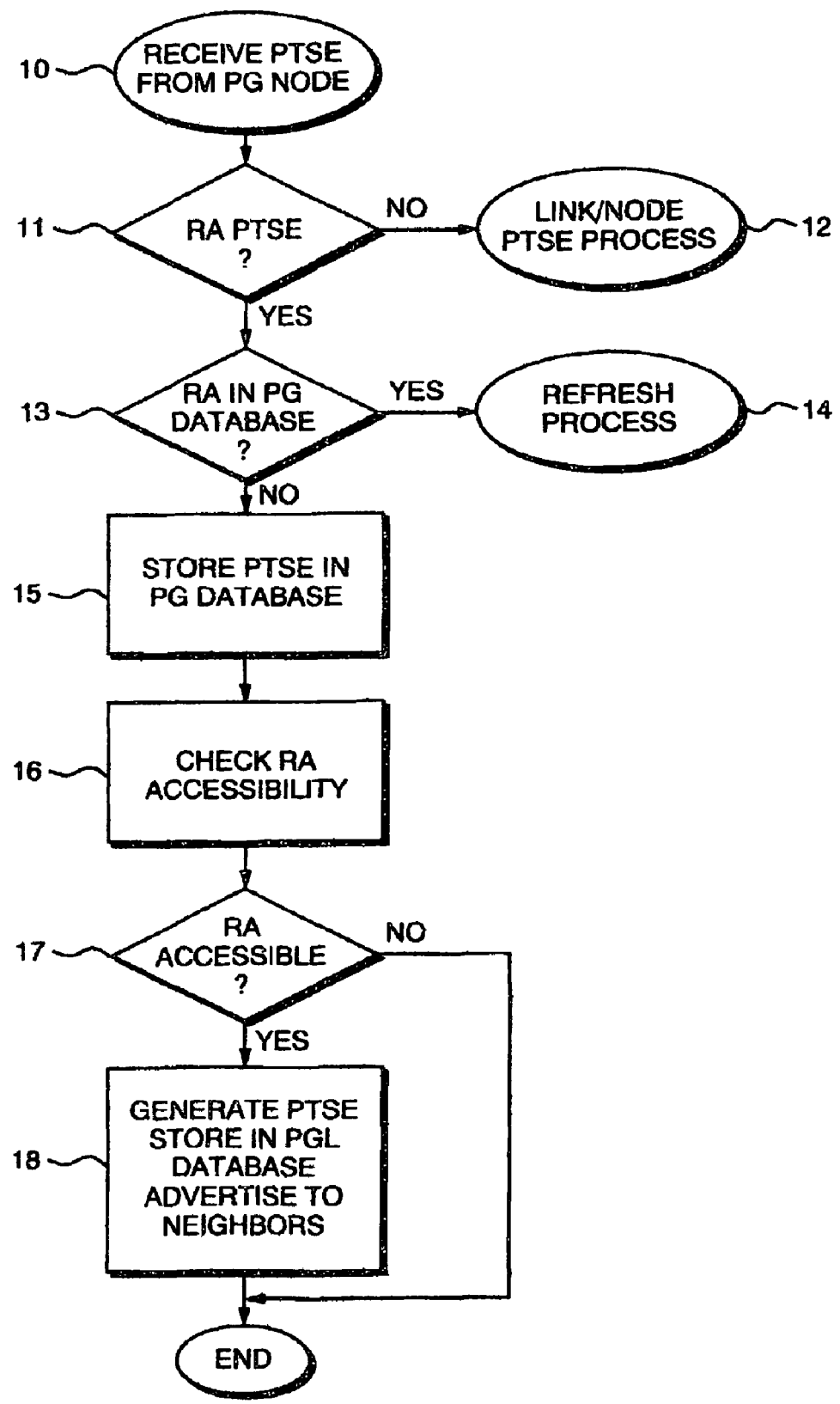
FIG. 3 is a flow chart showing a process implemented by a peer group leader node embodying the invention.

As indicated above, RA connectivity checking may be prompted by the peer group leader receiving a PTSE from a node in its child peer group. FIG. 3 illustrates the process performed by the peer group leader in this embodiment on receipt of such a PTSE, for the specific case where the PTSE relates to a reachable address prefix. The process begins at step 10 where the PTSE is received via the I/F & switching circuitry 3 and is identified by the control logic in the control unit 1 as originating from a child peer group node. The received PTSE could relate to a node, a link or an RA. (Alternatively, the received PTSE may be an "empty" PTSE indicating that a previously received PTSE should be flushed from the topology database, but such PTSE's are handled in accordance with the existing scheme specified by PNNI and need not be addressed further here). In step 11 the control logic checks whether the PTSE relates to an RA. If not, the control logic branches to a process for dealing with link or node PTSE's as indicated at 12. This process, in the case of link PTSE's, will be described further below. The processing of node PTSE's is not central to embodiments of the present invention and need not be described in detail here.

If the received PTSE is identified in step 11 as an RA PTSE, in step 13 the control logic accesses the PG topology database 4 to determine if a PTSE relating to that RA is already stored in this database. If so, ie. because the received PTSE is simply an update for refreshing an earlier PTSE, then the control logic branches to the usual refresh process, indicated at 14, which need not be described here. If not, then the PTSE relates to a new RA and the process proceeds to step 15 where the control logic stores the received PTSE in the PG topology database 4. In step 16 the control logic then checks whether the new RA is actually accessible via the peer group. Thus, as previously described, the control logic checks the originating node id in the received PTSE against the connectivity data stored in the memory 2 to determine whether the originating node is accessible via the peer group. If the originating node is accessible, the control logic decides (step 17) that the RA is accessible and the process proceeds to step 18. This step represents the process for PTSE maintenance at the peer group leader level of the hierarchy. Thus, the control logic generates a new PTSE for the new RA, stores the PTSE in the PGL topology database 5, and floods the new PTSE to its neighboring nodes in the next level of the hierarchy. The new RA is therefore advertised to the rest of the network. However, if in step 17 the new RA is determined to be inaccessible (because the originating node is determined to be inaccessible from the connectivity data), then step 18 is omitted and the process terminates. Accordingly, only new RA's which have been confirmed as accessible are propagated through the network. The RA connectivity checking thus serves as a filtering process to prevent irrelevant RA's, such as RA's from the old topology database of a node which is reconnected in a new network configuration, from being propagated through the network hierarchy. This in turn reduces transient database sizes, reduces the bandwidth requirement, and removes the risk of routing via an invalid path.

FIG. 3 illustrates the basic process for dealing with new RA's received from the peer group by the peer group leader. However, if the PGL topology database 5 already contains a PTSE defining a summary address, created by the peer group leader, which can also represent the new RA, then connectivity checking and readvertisement of the new RA is not required unless the new RA is indicated as one which should not be summarized, for example because it is of particular importance. Thus, an additional step is preferably included in the FIG. 3 process, eg. after step 15, whereby the control logic determines for appropriate RA's whether a PTSE defining such a summary address already exists in the PGL topology database 5. If so, the process can be terminated at this point.

Figure 4:
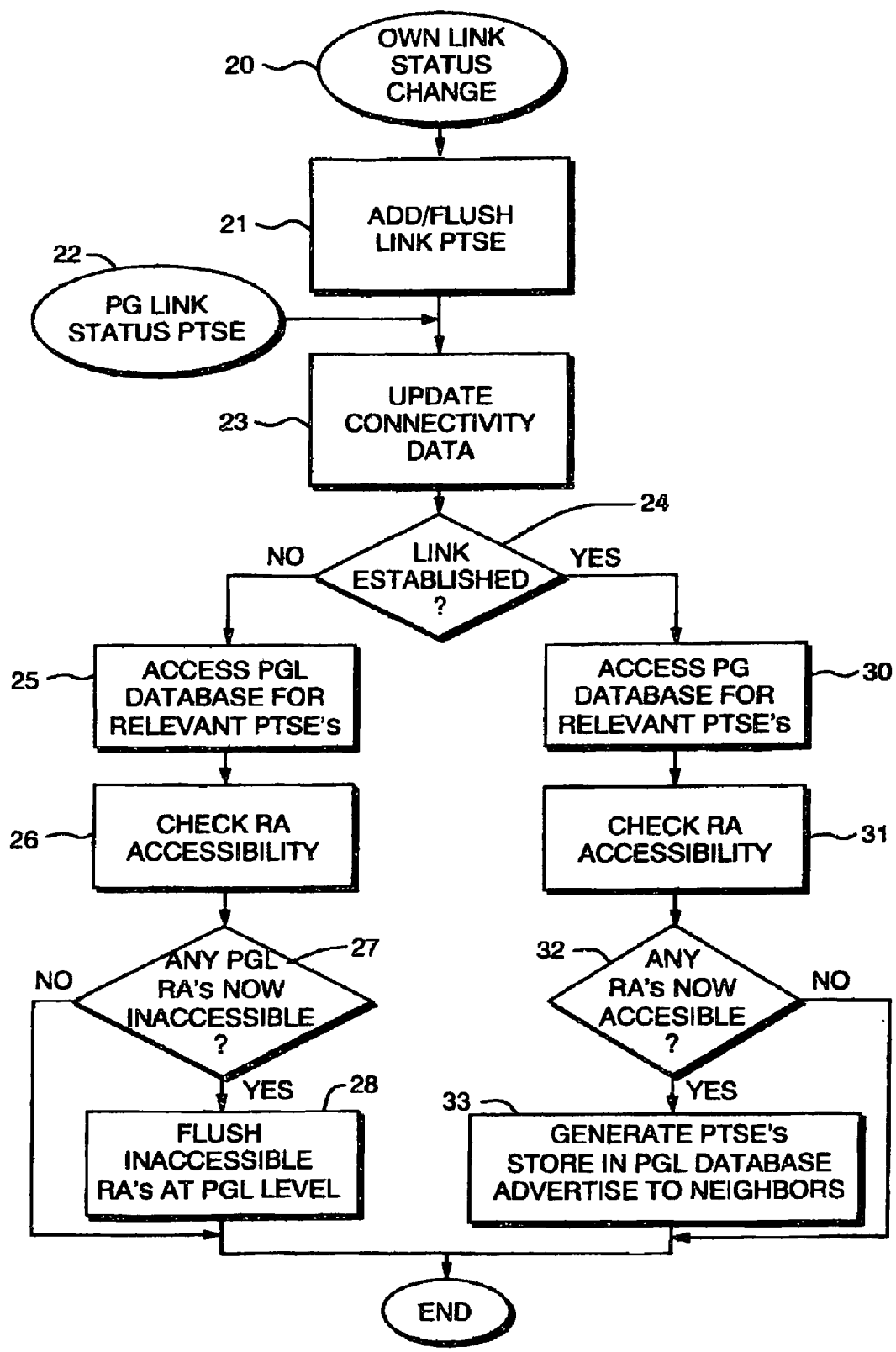
FIG. 4 is a flow chart showing another process implemented by a peer group leader node embodying the invention.

Another event which may signify a change in RA accessibility is a change in link status in the peer group. FIG. 4 illustrates the process for dealing with this situation in the present embodiment. This process may be initiated by the peer group leader detecting a change in status of one of its own links as indicated at 20 in the figure. In this case, depending on whether a link has been established or a link has become inoperative, the control logic implements the usual process of adding or flushing a link PTSE as indicated by step 21. Alternatively, the process may be initiated by the peer group leader receiving a PTSE relating to a link status change from another node in its child peer group as indicated at 22. However initiated, the process proceeds, from step 21 or step 22, to step 23 wherein the usual process of updating the connectivity data for the purpose of peer group leader election is performed. The new connectivity data, updated in accordance with the change in link status, is stored in the PG topology database as previously described. Assuming there is no change in peer group leader at this stage, the subsequent process depends on whether a link has been established or a link has become inoperative as indicated by step 24. If a link has become inoperative, the process proceeds to step 25 wherein the control logic accesses the PGL topology data for those PTSE's representing RA's received from other nodes in its child peer group, ie the PTSE's representing RA's which are not directly accessible at the peer group leader device itself. (The relevant PTSE's can be identified here by checking the node id's of the corresponding PTSE's in the PG topology database, data necessary to perform this cross-referencing having been stored in the database framework in the usual way). If such an RA is a summary address created by the peer group leader, the control logic also extracts the constituent RA's represented by the summary address from the PG topology database. For each RA so identified, in step 26 the control logic checks whether the RA is still accessible via the peer group from the updated connectivity data generated in step 23. If all RA's are found to be still accessible in step 27, no further action is required and the process terminates. However, if in step 27 any RA's in the PGL topology database are determined to be inaccessible (and in the case of summary addresses created by the peer group leader this means that the constituent addresses summarized by the peer group leader are all inaccessible), then in step 28 the control logic flushes the associated PTSE's at the PGL level in the usual way. That is, the control logic removes the associated PTSE's from the PGL topology database 5, and notifies the neighboring nodes in the next level of the hierarchy by flooding an empty PTSE. In this way, RA's which become inaccessible due to a link becoming inoperative are immediately flushed from the higher level routing domain, reducing transient topology database sizes and reducing the risk of calls being instigated to an address which is no longer accessible. In the particular case of addresses summarized by the peer group leader, inaccessibility of only one or some of the summarized addresses will not be advertised since the summary address remains at least partially valid. This does not present a significant problem, however, since important addresses are generally not summarized so important changes will still be advertised to the rest of the network.

Returning to step 24 in FIG. 4, if it is determined here that a link has been established, operation proceeds to step 30. Here, the control logic accesses memory 2 to identify RA's defined by PTSE's in the PG topology database 4 and which are not represented by PTSE's in the PGL topology database 5. For each RA so identified, the control logic checks in step 31 whether the RA is accessible as previously described. If no RA's are found to be newly accessible in step 32, no further action is required and the process terminates. If any RA's are found to be accessible, then, in step 33, the control logic generates a new PTSE for each RA, stores the PTSE in the PGL topology database 5, and advertises the RA to the network by flooding the new PTSE to neighboring nodes in the next hierarchy level. In this way, addresses which become accessible when a link is established, eg. when a previously inoperative link is restored, are immediately advertised to the network.

Figure 1:
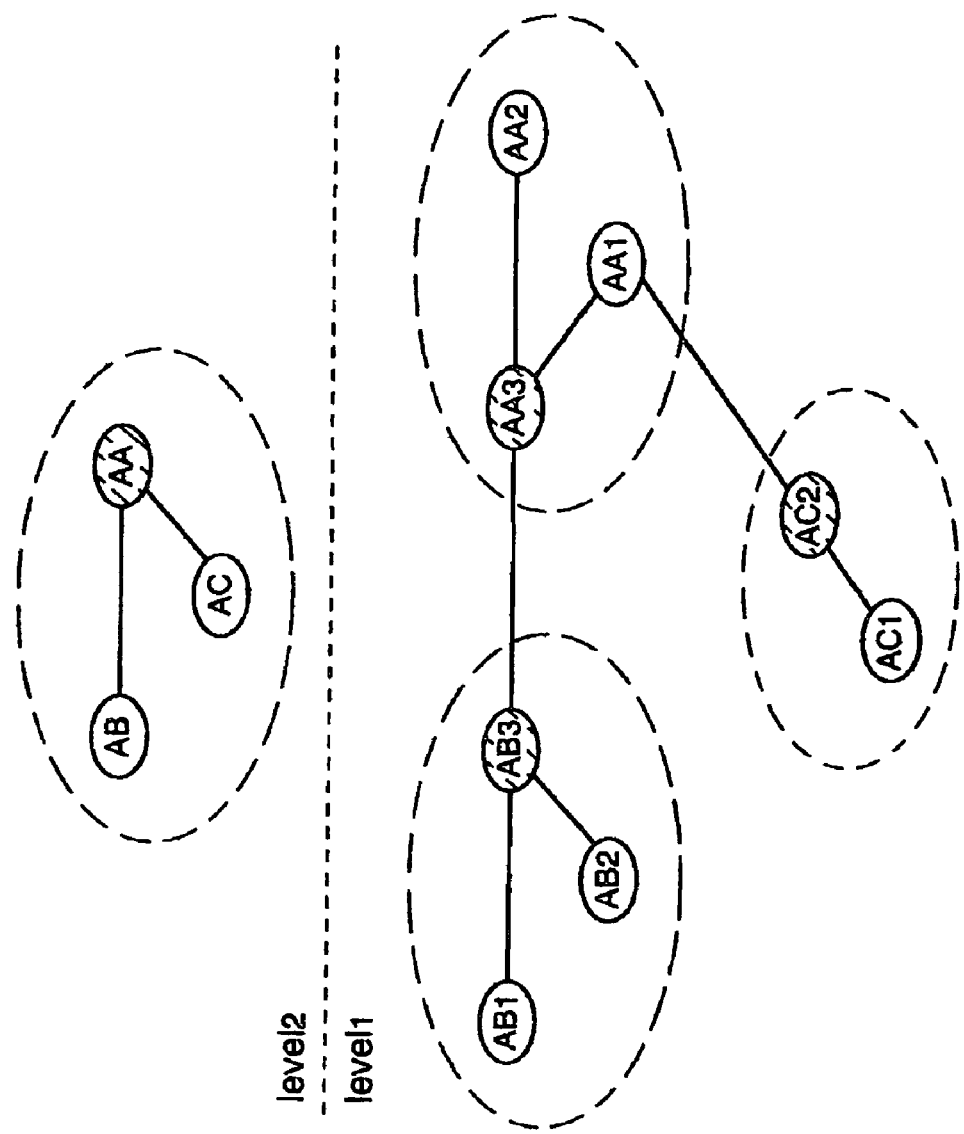
FIG. 1 illustrates a simple example of a PNNI hierarchical network.

It will be seen from the above that embodiments of the present invention provide significant advantages over existing systems. For example, unreachable address prefixes are not propagated through higher levels of the PNNI routing domain, and topology databases are quickly cleansed of irrelevant topology elements, reducing transient topology database sizes. Addresses that become unreachable can be immediately removed from the higher level routing domain, and unnecessary "crankback" (where a failed call setup is returned to the source node for rerouting) can be avoided in many cases. Moreover, the "backup" routing problem mentioned earlier can be eliminated, even in those cases where the use of crankback would not help. This will be illustrated with reference to FIG. 5. This figure shows the network of FIG. 1 in which an ATM service is attached to node AA2 with reachable address prefix 47111. Because the service is important, a backup service with the same reachable address is attached to AC1. Suppose that a call is received at AB2 addressed to 47111. AB2 will compute a route (in the form of a "Designated Transit List" or DTL) based on its view of the network topology. Thus, AB2 will compute the DTL:

AB–AA

Figure 5:
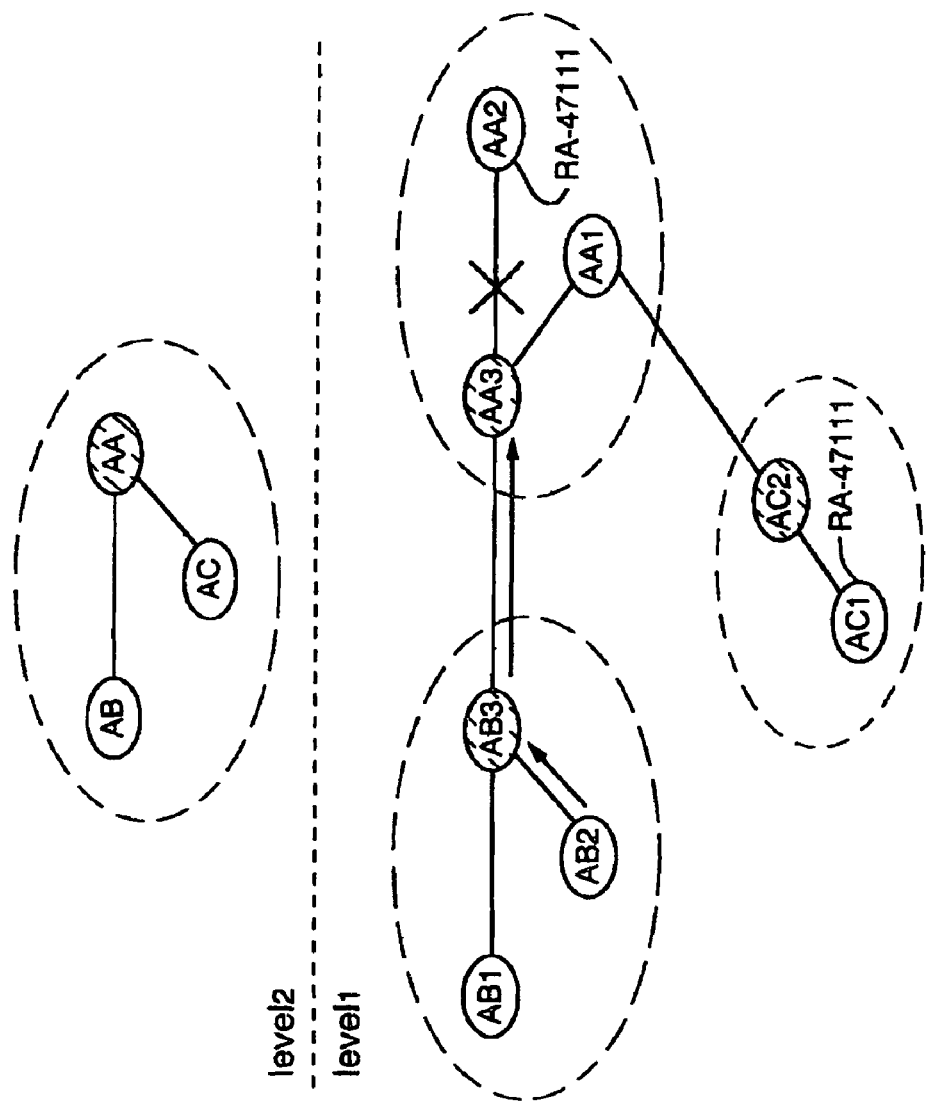
FIG. 5 illustrates a PNNI hierarchical network to which reference will be made in describing operation of a network embodying the invention.

AB2–AB3 meaning that, in level 1 of the hierarchy the call should go from AB2 to AB3, and in level 2 of the hierarchy the call should go from AB to AA. AB2 cannot see the details of nodes and links within AA2's peer group since this peer group is abstracted to logical node AA in level 2 of the hierarchy, so that AB2 will have simply received PTSE's defining AA and RA 47111 from its peer group leader AB2 acting as logical node AB in level 2. In the real network, the call setup request will go from AB2 to AB3 and from AB3 to AA3 as indicated in FIG. 5. Suppose further that the link connecting AA3 and AA2 has recently failed as indicated in the figure. With the existing scheme, AA3 will reject the call setup because there is no route to the destination node (AA2) in the peer group. The crankback mechanism therefore comes into play and the call setup will be returned to AB2 with the cause code "Node AA blocked". AB2 will not attempt to reroute the call because, according to its view of the network topology AC is only reachable via AA and AA is blocked. This state will remain until the unconnected topology elements from AA2 naturally expire within the network.

Consider now the case where the network of FIG. 5 is a network embodying the present invention, so that the peer group leader node AA3 operates as described in detail above. In this case, on detecting that the link to AA2 has failed, AA3 will determine that RA47111 is now inaccessible. AA3 will therefore flush the PTSE representing RA 47111 from its PGL topology database, and this information will be flooded on to AB and AC. AB and AC will also flush the PTSE from their databases and consequently it will be flushed from the databases of all switches in AB and AC's child peer groups. A call setup request originating at AB2 destined for RA47111 will now follow the DTL:

AB–AA–AC

AB2–AB3 since RA47111 is no longer advertised by AA. In the real network the call setup will therefore go via switches AB2, AB3, AA3, AA1, AC2 and AC1, and the backup service will function as desired.

It will be appreciated that, while preferred embodiments of the invention have been described in detail above, many changes and modifications may be made to the embodiments described without departing from the scope of the invention. For example, while operation of the embodiments has been illustrated with particular reference to a two-level PNNI hierarchy for simplicity, the same principles can of course be applied in a node serving as peer group leader at any level of a multilevel hierarchy.

We claim:

1. A method of address management in a node serving as peer group leader for a peer group of nodes in one level of the hierarchy of a private network-to-network interface (PNNI) hierarchical network whereby the peer group leader represents said peer group to one or more neighboring nodes in the next level up of the hierarchy, the peer group leader having a memory for storing peer group topology data, comprising first address data which is supplied to the peer group leader from nodes in the peer group and represents addresses for access by the network, and peer group leader topology data, comprising second address data which is supplied to said neighboring nodes by the peer group leader and represents addresses accessible via the peer group, the method comprising:
  checking whether addresses represented by said first address data are accessible via the peer group and identifying addresses for which there are changes in accessibility;
  notifying said neighboring nodes of changes in the accessibility of addresses so identified; and
  updating said second address data comprising said peer group leader topology data in accordance with said changes.

2. A method according to claim 1 comprising:
  checking, in response to receipt by the peer group leader from a node in said peer group of first address data representing an address which is not represented in said peer group topology data, whether said address is accessible via the peer group; and
  only if said address is accessible via the peer group, supplying address data representing the address to said neighboring nodes and updating the peer group leader topology data with that address data.

3. A method according to claim 2 wherein, on receipt by the peer group leader of said address data, further comprising determining whether said address represented by the address data is also represented by a summary address generated by said peer group leader, and wherein the steps of checking accessibility of the address represented by the address data and supplying address data to said neighboring nodes are performed only when said address is not represented in said peer group leader topology data by a summary address generated by the peer group leader.

4. A method according to claim 2 wherein said address data includes node id data indicative of the node which originated that address data, and wherein the peer group leader maintains connectivity data indicative of the state of links and nodes in said peer group, wherein the step of checking the accessibility of an address comprises determining from said connectivity data whether the node corresponding to the node id data included in address data representing that address is accessible via the peer group.

5. A method according to claim 1 comprising:
  checking, in response to detection by the peer group leader that a link connecting nodes in said peer group has become inoperative, whether at least a class of addresses represented in said peer group leader topology data are still accessible; and
  for an address so identified as inaccessible, notifying said neighboring nodes of the loss of accessibility of that address and removing the address data representing that address from the peer group leader topology data.

6. A method according to claim 5 wherein said class of addresses comprises addresses accessible at nodes other than the peer group leader.

7. A method according to claim 5 wherein, for an address identified as inaccessible in response to detection of a link becoming inoperative, further comprising determining whether said address represented by the address data is also represented by a summary address generated by said peer group leader, and wherein the steps of notifying said neighboring nodes and removing said address data are performed only when that address is not represented in said peer group leader topology data by a summary address generated by the peer group leader from a plurality of addresses not all of which are inaccessible.

8. A method according to claim 5 wherein said address data includes node id data indicative of the node which originated that address data, and wherein the peer group leader maintains connectivity data indicative of the state of links and nodes in said peer group, wherein the step of checking the accessibility of an address comprises determining from said connectivity data whether the node corresponding to the node id data included in address data representing that address is accessible via the peer group.

9. A method according to claim 1 comprising:
  checking, in response to detection by the peer group leader that a link has been established between nodes in said peer group, whether at least a class of addresses represented in said peer group topology data but not said peer group leader topology data are now accessible; and
  for an address so identified as accessible, supplying address data representing that address to said neighboring nodes and updating the peer group leader topology data with that address data.

10. A method according to claim 9 wherein said class of addresses comprises addresses accessible at nodes other than the peer group leader.

11. A method according to claim 9 wherein said address data includes node id data indicative of the node which originated that address data, and wherein the peer group leader maintains connectivity data indicative of the state of links and nodes in said peer group, wherein the step of checking the accessibility of an address comprises determining from said connectivity data whether the node corresponding to the node id data included in address data representing that address is accessible via the peer group.

12. Address management apparatus for management of addresses in a node serving as peer group leader for a peer group of nodes in one level of the hierarchy of a private network-to-network interface (PNNI) hierarchical network, whereby the peer group leader represents said peer group to one or more neighboring nodes in the next level up of the hierarchy, the peer group leader having a memory for storing peer group topology data, comprising first address data which is supplied to the peer group leader from nodes in the peer group and represents addresses for access by the network, and peer group leader topology data, comprising second address data which is supplied to said neighboring nodes by the peer group leader and represents addresses accessible via the peer group, the apparatus comprising control logic for accessing data in said memory and configured to:

check whether addresses represented by said first address data are accessible via the peer group and identify addresses for which there are changes in accessibility;

notify said neighboring nodes of changes in the accessibility of addresses so identified; and update said second address data comprising said peer group leader topology data in accordance with said changes.

13. Apparatus according to claim 12 wherein the control logic is configured to respond to receipt by the peer group leader from a node in said peer group of address data representing an address which is not represented in said peer group topology data, by:

checking whether said address is accessible via the peer group; and only if said address is accessible via the peer group, supplying address data representing the address to said neighboring nodes and updating the peer group leader topology data with that address data.

14. Apparatus according to claim 13 wherein, on receipt by the peer group leader of said address data, the control logic is configured to perform the further step of determining whether said address represented by the address data is also represented by a summary address generated by said peer group leader, and to perform further steps of checking accessibility of the address represented by the address data and supplying address data to said neighboring nodes only when said address is not represented in said peer group leader topology data by a summary address generated by the peer group leader.

15. Apparatus according to claim 13 wherein said address data includes node id data indicative of the node which originated that address data, and wherein the peer group leader maintains connectivity data indicative of the state of links and nodes in said peer group, wherein the control logic is configured to check the accessibility of an address by determining from said connectivity data whether the node corresponding to the node id data included in address data representing that address is accessible via the peer group.

16. Apparatus according to claim 12 wherein the control logic is configured to respond to detection by the peer group leader that a link connecting nodes in said peer group has become inoperative by:

checking whether at least a class of addresses represented in said peer group leader topology data are still accessible; and for an address so identified as inaccessible, notifying said neighboring nodes of the loss of accessibility of that address and removing the address data representing that address from the peer group leader topology data.

17. Apparatus according to claim 16 wherein said class of addresses comprises addresses accessible at nodes other than the peer group leader.

18. Apparatus according to claim 16 wherein, for an address identified as inaccessible in response to detection of a link becoming inoperative, the control logic is configured to perform the steps of determining if said address is represented in said peer group leader topology data by a summary address generated by the peer group leader and of notifying said neighboring nodes and removing said address data only when that address is not represented in said peer group leader topology data by a summary address generated by the peer group leader from a plurality of addresses not all of which are inaccessible.

19. Apparatus according to claim 16 wherein said address data includes node id data indicative of the node which originated that address data, and wherein the peer group leader maintains connectivity data indicative of the state of links and nodes in said peer group, wherein the control logic is configured to check the accessibility of an address by determining from said connectivity data whether the node corresponding to the node id data included in address data representing that address is accessible via the peer group.

20. Apparatus according to claim 12 wherein the control logic is configured to respond to detection by the peer group leader that a link has been established between nodes in said peer group by:

checking whether at least a class of addresses represented in said peer group topology data but not said peer group leader topology data are now accessible; and for an address so identified as accessible, supplying address data representing that address to said neighboring nodes and updating the peer group leader topology data with that address data.

21. Apparatus according to claim 20 wherein said class of addresses comprises addresses accessible at nodes other than the peer group leader.

22. Apparatus according to claim 20 wherein said address data includes node id data indicative of the node which originated that address data, and wherein the peer group leader maintains connectivity data indicative of the state of links and nodes in said peer group, wherein the control logic is configured to check the accessibility of an address by determining from said connectivity data whether the node corresponding to the node id data included in address data representing that address is accessible via the peer group.

23. A device for connection in a private network-to-network interface (PNNI) hierarchical network as a node of said network, the device being operable to serve as peer group leader for a peer group of nodes in one level of the network hierarchy such that the device represents said peer group to one or more neighboring nodes in the next level up of the hierarchy, the device comprising:

a memory for storing peer group topology data, comprising first address data which is supplied to the device from nodes in the peer group and represents addresses for access by the network, and peer group leader topology data, comprising second address data which is supplied to said neighboring nodes by the device and represents addresses accessible via the peer group; and control logic for accessing data in said memory and configured to: check whether addresses represented by said first address data are accessible via the peer group; identify addresses for which there are changes in accessibility; notify said neighboring nodes of changes in the accessibility of addresses so identified; and update said second address data comprising said peer group leader topology data in accordance with said changes.

24. A private network-to-network interface (PNNI) hierarchical network comprising a plurality of nodes, at least one of said nodes comprising a device operable to serve as peer group leader for a peer group of nodes in one level of the network hierarchy such that the device represents said peer group to one or more neighboring nodes in the next level up of the hierarchy, the device comprising:

a memory for storing peer group topology data, comprising first address data which is supplied to the device from nodes in the peer group and represents addresses for access by the network, and peer group leader topology data, comprising second address data which is supplied to said neighboring nodes by the device and represents addresses accessible via the peer group; and control logic for accessing data in said memory and configured to: check whether addresses represented by said first address data are accessible via the peer group; identify addresses for which there are changes in accessibility; notify said neighboring nodes of changes in the accessibility of addresses so identified; and update said second address data comprising said peer group leader topology data in accordance with said changes.

25. A computer program product comprising a computer readable medium having embodied therein computer program code which, when loaded in a processor of a node in a private network-to-network interface (PNNI) hierarchical network, configures the processor for performing an address management method when nodes in one level of the network hierarchy whereby the peer group leader represents said peer group to one or more neighboring nodes in the next level up of the hierarchy, the peer group leader having a memory for storing peer group topology data, comprising first address data which is supplied to the peer group leader from nodes in the peer group and represents addresses for access by the network, and peer group leader topology data, comprising second address data which is supplied to said neighboring nodes by the peer group leader and represents addresses accessible via the peer group, said address management method comprising:

checking whether addresses represented by said first address data are accessible via the peer group and identifying addresses for which there are changes in accessibility;

notifying said neighboring nodes of changes in the accessibility of addresses so identified; and updating said second address data comprising peer group leader topology data in accordance with said changes.

* * * * *